United States Patent
Jung et al.

(10) Patent No.: US 12,482,815 B2
(45) Date of Patent: Nov. 25, 2025

(54) METHOD OF MANUFACTURING NEGATIVE ELECTRODE HAVING INORGANIC COATING LAYER FORMED THEREON

(71) Applicant: LG ENERGY SOLUTION, LTD., Seoul (KR)

(72) Inventors: Byoung Hyo Jung, Daejeon (KR); Jung Hun Choi, Daejeon (KR); Min Chul Jang, Daejeon (KR); Yo Han Kwon, Daejeon (KR); Yeon Suk Hong, Daejeon (KR); Suk Il Youn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 567 days.

(21) Appl. No.: 17/914,794

(22) PCT Filed: Oct. 6, 2021

(86) PCT No.: PCT/KR2021/013711
§ 371 (c)(1),
(2) Date: Sep. 27, 2022

(87) PCT Pub. No.: WO2022/085995
PCT Pub. Date: Apr. 28, 2022

(65) Prior Publication Data
US 2023/0135232 A1    May 4, 2023

(30) Foreign Application Priority Data

Oct. 19, 2020   (KR) .................. 10-2020-0134992

(51) Int. Cl.
| | |
|---|---|
| *H01M 4/36* | (2006.01) |
| *H01M 4/04* | (2006.01) |
| *H01M 4/38* | (2006.01) |
| *H01M 4/48* | (2010.01) |
| *H01M 4/02* | (2006.01) |

(52) U.S. Cl.
CPC ......... *H01M 4/366* (2013.01); *H01M 4/0404* (2013.01); *H01M 4/382* (2013.01); *H01M 4/386* (2013.01); *H01M 4/48* (2013.01); *H01M 2004/027* (2013.01)

(58) Field of Classification Search
CPC .... H01M 4/366; H01M 4/362; H01M 4/0404; H01M 4/0416; H01M 4/382; H01M 4/386; H01M 4/48; H01M 4/58; H01M 2004/027
See application file for complete search history.

(56) References Cited

U.S. PATENT DOCUMENTS

| | | |
|---|---|---|
| 5,567,474 A | 10/1996 | Dover et al. |
| 11,316,145 B2 | 4/2022 | Woo et al. |
| 2009/0148773 A1 | 6/2009 | Volkov et al. |
| 2013/0177808 A1 | 7/2013 | Wang et al. |
| 2015/0079463 A1 | 3/2015 | Yamamoto et al. |
| 2016/0126543 A1* | 5/2016 | Ota ............. H01M 4/587 |
| 2016/0351888 A1 | 12/2016 | Wietelmann et al. |
| 2018/0040914 A1 | 2/2018 | Grant et al. |
| 2019/0198865 A1 | 6/2019 | Kim et al. |
| 2019/0237750 A1 | 8/2019 | Kim et al. |
| 2020/0058929 A1 | 2/2020 | Chae et al. |
| 2020/0251728 A1 | 8/2020 | Song et al. |
| 2020/0335789 A1 | 10/2020 | Chae et al. |
| 2021/0066704 A1* | 3/2021 | Verbrugge ........... H01M 4/382 |
| 2022/0093908 A1* | 3/2022 | Ritchie ............... H01M 50/46 |

FOREIGN PATENT DOCUMENTS

| | | |
|---|---|---|
| CN | 102642024 A | 8/2012 |
| CN | 104993104 A | 10/2015 |
| CN | 111542949 A | 8/2020 |
| JP | 2009-164014 A | 7/2009 |
| JP | 2010-73402 A | 4/2010 |
| JP | 2012-28729 A | 2/2012 |
| JP | 2013-143375 A | 7/2013 |
| JP | 2013-243116 A | 12/2013 |
| JP | 2016-511916 A | 4/2016 |
| JP | 2018-142528 A | 9/2018 |
| JP | 2020-517078 A | 6/2020 |
| KR | 10-2018-0051536 A | 5/2018 |
| KR | 10-2019-0012973 A | 2/2019 |
| KR | 10-2019-0017149 A | 2/2019 |

(Continued)

OTHER PUBLICATIONS

Japanese Notice of Reasons for Refusal for Japanese Application No. 2022-560126, dated Nov. 6, 2023, with an English translation.
International Search Report (PCT/ISA/210) issued in PCT/KR2021/013711 mailed on Jan. 25, 2022.
Extended European Search Report for European Application No. 21883067.7, dated Dec. 15, 2023.
Japanese Notice of Reasons for Refusal for Japanese Application No. 2022-560126, dated May 7, 2024, with an English translation.
Chinese Office Action and Search Report for Chinese Application No. 202180028864.2, dated Mar. 18, 2025, with English translation.

*Primary Examiner* — Raymond Alejandro (74) *Attorney, Agent, or Firm* — Birch, Stewart, Kolasch & Birch, LLP (57) ABSTRACT

The present technology relates to a method of manufacturing a negative electrode, and the method includes: manufacturing a negative electrode having a negative electrode active material layer formed thereon by coating a negative electrode slurry including a negative electrode active material at least on one surface of a current collector; pre-lithiating the negative electrode; and forming an inorganic coating layer on a surface of the negative electrode active material layer by aging the pre-lithiated negative electrode under an $CO_2$ atmosphere.

10 Claims, 5 Drawing Sheets

(56) References Cited

FOREIGN PATENT DOCUMENTS

| KR | 10-2019-0017651 A | 2/2019 |
| KR | 10-2019-0044450 A | 4/2019 |
| KR | 10-2019-0079321 A | 7/2019 |
| KR | 10-2019-0083304 A | 7/2019 |
| KR | 10-2019-0115706 A | 10/2019 |
| KR | 10-2020-0053300 A | 5/2020 |
| WO | WO 2020/096177 A1 | 5/2020 |

* cited by examiner

METHOD OF MANUFACTURING NEGATIVE ELECTRODE HAVING INORGANIC COATING LAYER FORMED THEREON

TECHNICAL FIELD

This application claims the benefit of priority based on Korean Patent Application No. 10-2020-0134992, filed on Oct. 19, 2020, and the entire contents of the Korean patent application are incorporated herein by reference.

The present invention relates to a method of manufacturing a negative electrode, and a negative electrode manufactured by the method of manufacturing a negative electrode, and more specifically, to a method of manufacturing a negative electrode having an inorganic coating layer formed thereon, and a negative electrode manufactured by the method.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, to thereby form a positive electrode active material layer and a negative electrode active material layer, respectively, followed by drying and rolling them.

In the case of such a negative electrode, a passive film such as a solid electrolyte interface (SEI) layer is formed on the surface of the negative electrode during the initial charge. The passive film interrupts injection of the organic solvent into the negative electrode and suppresses decomposition reaction of the organic solvent, thereby stabilizing the structure of the negative electrode, improving the reversibility of the negative electrode, and allowing the negative electrode to be usable. However, since the formation reaction of the passive film is an irreversible reaction, the consumption of the lithium ions is caused, thereby decreasing the capacity of the battery, and as the battery cycle is repeated, the lithium ions are consumed, thereby causing capacity reduction and cycle lifespan reduction.

As such, a method for forming a passive film on the surface of a negative electrode, preventing the capacity reduction and improving cycle lifespan by pre-lithiating the negative electrode through inserting lithium into the negative electrode is currently developed. Such a pre-lithiation method includes a physical method of allowing lithium metal to directly contact the surface of the negative electrode, and a method of connecting lithium metal with the negative electrode and electrochemically charging the negative electrode.

However, since the pre-lithiated negative electrode is in a reduced state, by-products are generated by reaction between lithium ions and air or moisture in the air. Lithium, which is introduced in the pre-lithiation process, is lost due to generation of by-products, and the targeted lithium dosage decreases.

DISCLOSURE

Technical Problem

The present invention is believed to solve at least some of the above problems. For example, an aspect of the present invention provides a method of manufacturing a negative electrode capable of suppressing the loss of lithium caused by redox reaction between the negative electrode and air and the moisture in the air, and a negative electrode manufactured by the method.

Technical Solution

A method of manufacturing a negative electrode according to the present invention includes: manufacturing a negative electrode having a negative electrode active material layer formed thereon by coating a negative electrode slurry including a negative electrode active material at least on one surface of a current collector; pre-lithiating the negative electrode; and forming an inorganic coating layer on a surface of the negative electrode active material layer by aging the pre-lithiated negative electrode under an $CO_2$ atmosphere.

At this time, the inorganic coating layer includes one or more compounds selected from the group consisting of $Li_2O$, $LiOH$ and $Li_2CO_3$.

In a specific example, the inorganic coating layer may include all of $Li_2O$, $LiOH$ and $Li_2CO_3$.

The negative electrode active material may be one or more selected from the group consisting of a graphite-based active material and a silicon-based active material.

In one example, the pre-lithiating of the negative electrode may be performed by directly contacting a lithium metal on the negative electrode active material layer.

At this time, the pre-lithiating of the negative electrode may include bonding a lithium metal film on the negative electrode active material layer and then performing lamination.

In another example, the pre-lithiating of the negative electrode may be performed by connecting the negative electrode to a lithium metal and performing electrochemical charge.

Further, in a specific example, a pressure of $CO_2$ during the aging of the pre-lithiated negative electrode may be in a range of 0.1 to 10 mTorr.

Further, in a specific example, an aging temperature may be in a range of 20 to 60° C.

Further, in a specific example, aging time may be in a range of 10 to 60 hours.

Further, the present invention provides a negative electrode. The negative electrode has a negative electrode active material layer formed thereon by coating a negative electrode slurry including a negative electrode active material at least on one surface of a current collector. Herein, the negative electrode active material layer is pre-lithiated, and an inorganic coating layer, which includes one or more compounds selected from the group consisting of $Li_2O$, $LiOH$ and $Li_2CO_3$, may be formed on a surface of the negative electrode active material layer.

Further, the present invention provides a secondary battery including the above-described negative electrode.

Advantageous Effects

According to the present invention, it is possible to form an inorganic coating layer capable of blocking a redox reaction on the surface of the negative electrode by aging the pre-lithiated negative electrode under a $CO_2$ atmosphere. As such, it is possible to suppress the loss of lithium caused by redox reaction between the negative electrode and air and the moisture in the air, and it is possible to prevent the decrease of cycle characteristics and capacity of a battery.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

Figure 1:
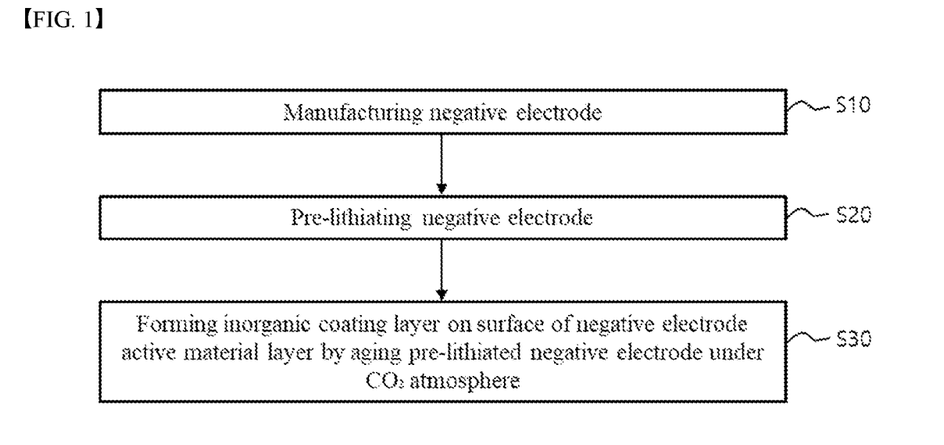
FIG. 1 is a flowchart illustrating the sequence of a method of manufacturing a negative electrode according to the present invention.

FIG. 1 is a flowchart illustrating the sequence of a method of manufacturing a negative electrode according to the present invention.

Referring to FIG. 1, a method of manufacturing a negative electrode according to the present invention includes: manufacturing a negative electrode having a negative electrode active material layer formed thereon by coating a negative electrode slurry including a negative electrode active material on the surface of a current collector (S10); pre-lithiating the negative electrode (S20); and forming an inorganic coating layer on a surface of the negative electrode active material layer by aging the pre-lithiated negative electrode under an $CO_2$ atmosphere (S30).

As described above, since the pre-lithiated negative electrode is in a reduced state, by-products are generated by reaction between lithium ions and air or moisture in the air. Lithium, which is introduced in the pre-lithiation process, is lost due to generation of by-products, and the targeted lithium dosage decreases.

According to the present invention, it is possible to form an inorganic coating layer capable of blocking a redox reaction on the surface of the negative electrode by aging the pre-lithiated negative electrode under a $CO_2$ atmosphere. As such, it is possible to suppress the loss of lithium caused by redox reaction between the negative electrode and air and the moisture in the air, and it is possible to prevent the decrease of cycle characteristics and capacity of a battery.

Hereinafter, each step of a method of manufacturing a negative electrode according to the present invention will be described in detail.

<Preparation of Negative Electrode>

First, in order to perform pre-lithiation, a negative electrode, which is a subject of pre-lithiation, is manufactured.

The negative electrode may be manufactured by forming a negative electrode active material layer by coating a negative electrode slurry containing a negative electrode active material on at least one surface of the negative electrode current collector. The negative electrode slurry may further include conductive materials and binders.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The negative electrode active material may contain at least one selected from the group consisting of a carbon-based active material and a silicon-based active material.

The silicon-based active material may impart excellent capacity characteristics to the negative electrode or secondary battery of the present invention and may contain a compound represented by $SiO_x$ (0≤x<2). Since Sift does not react with lithium ions, lithium cannot be stored, and thus x is preferably in the above range. More preferably, the silicon-based oxide may be SiO. The average particle diameter ($D_{50}$) of the silicon-based oxide may be 1 to 30 μm, and preferably 3 to 15 μm in terms of reducing side reaction with the electrolyte solution while maintaining structural stability during charge/discharge. The average particle diameter $D_{50}$ may be measured using, for example, a laser diffraction method.

The carbon-based active material may impart excellent cycle characteristics or battery lifespan performance to a secondary battery or a negative electrode for a secondary battery of the present invention. Specifically, the carbon-based active material may contain at least one selected from the group consisting of artificial graphite, natural graphite, hard carbon, soft carbon, carbon black, acetylene black, Ketjen black, super P, graphene and textile carbon, and preferably at least one selected from the group consisting of artificial graphite and natural graphite. The average particle diameter ($D_{50}$) of the carbon-based oxide may be 10 to 30 μm, and preferably 15 to 25 μm in terms of reducing side reaction with the electrolyte solution while maintaining structural stability during charge/discharge.

Specifically, both the silicon-based active material and the carbon-based active material may be used as the negative electrode active material in terms of improving both the capacity characteristics and cycle characteristics. Specifically, the negative electrode active material may include the carbon-based active material and the silicon-based active material in the weight ratio of 50:50 to 95:5, and preferably in the weight ratio of 60:40 to 80:20.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

<Pre-Lithiation>

When a negative electrode is manufactured, the negative electrode is pre-lithiated.

In the present invention, there is no particular limitation on the method of pre-lithiating the negative electrode, and for example, both physicochemical methods or electrochemical methods can be used.

In one example, the pre-lithiating of the negative electrode is performed by directly contacting a lithium metal on the negative electrode active material layer.

Figure 2:
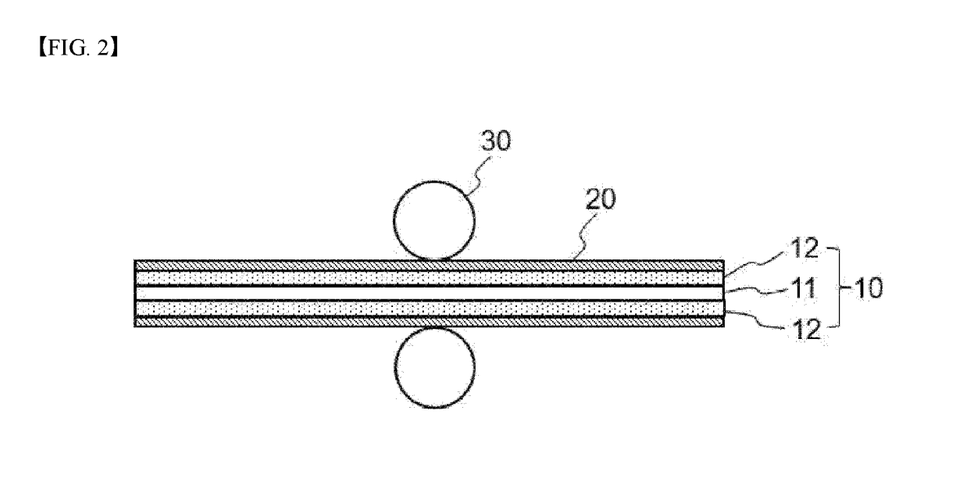
FIG. 2 is a schematic diagram illustrating a pre-lithiation process according to an embodiment of the present invention.

FIG. 2 is a schematic diagram illustrating a pre-lithiation process according to an embodiment of the present invention.

Referring to FIG. 2, the pre-lithiating of the negative electrode 10 includes bonding a lithium metal film 20 on the negative electrode active material layer 12 and then performing lamination.

Specifically, when the negative electrode 10 is prepared, the lithium metal film 20 is laminated. This process can be performed, for example, by a roll-to-roll process. In this case, the negative electrode is wound by an unwinding roller (not shown) and is then unwound when the lamination is started. Further, a lithium metal film 20 is also wound on a separate roll (not shown) and is then unwound when the lamination is started. At this time, the lithium metal film 20 itself may be used, but what is obtained by laminating a lithium metal film on one surface of a polymer film (not shown) may also be used. The thickness of the lithium metal film 20 may be in the range of 1 to 10 μm, and specifically in the range of 3 to 8 μm. When the thickness of the lithium metal film 20 is in the above range, an appropriate amount of lithium ions may be doped on the negative electrode.

Thereafter, the lithium metal film 20 is bonded to a negative electrode active material layer 12 formed on the negative electrode current collector 11. Thereafter, the lithium metal film 20 and the negative electrode 10 are pressed using the pressing member 30. The shape of the pressing member 30 is not particularly limited. However, as shown in FIG. 2, it is possible to use a pair of pressing rollers, or it is possible to apply surface pressure to the lithium metal film 20 and the negative electrode 10 by using the pressing jig of a rectangular shape. However, when using a pair of pressing rollers, nip pressure is applied to the negative electrode 10 and the lithium metal film 20, and accordingly, uniform force can be applied. As such, the lower pressure can be applied, compared to the case of applying surface pressure.

As the negative electrode 10, on which the lithium metal film 20 has been laminated, is stored for a predetermined time, lithium ions, which are intercalated by pre-lithiation, may be uniformly diffused to the surface and inside of the negative electrode active material layer 12.

Figure 3:
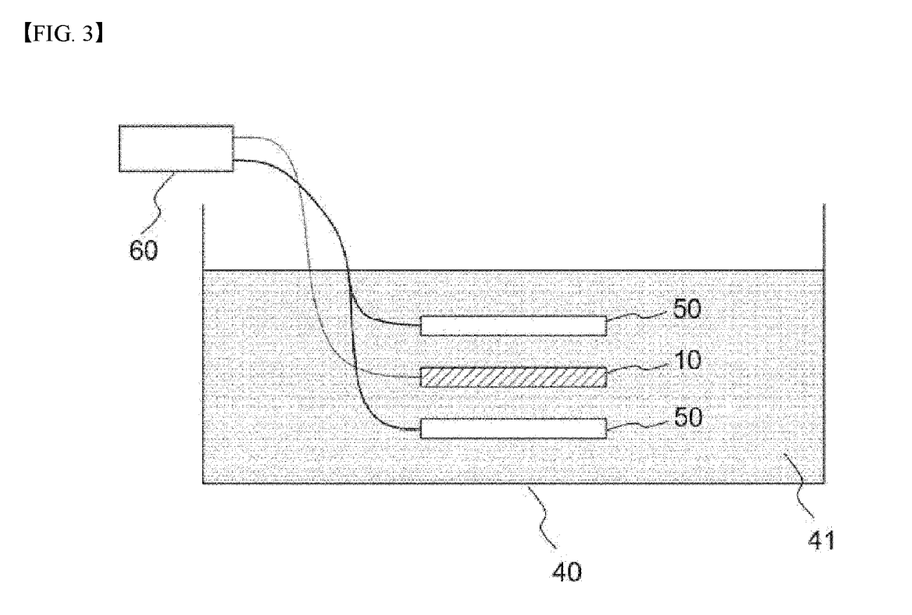
FIG. 3 is a schematic diagram illustrating a pre-lithiation process according to another embodiment of the present invention.

FIG. 3 is a schematic diagram illustrating a pre-lithiation process according to another embodiment of the present invention.

Referring to FIG. 3, the pre-lithiating of the negative electrode 10 is performed by connecting the negative electrode 10 to a lithium metal 50 and performing electrochemical charge.

In this case, the pre-lithiation is performed in a pre-lithiation reactor 40 which accommodates a pre-lithiation solution 41. Specifically, the pre-lithiation reactor 40, where the pre-lithiation solution 41 has been accommodated, accommodates the negative electrode 10 in a state that is spaced apart from the lithium metal 50, and electrochemical charge can be performed after connecting the negative electrode 10 and the lithium metal 50 to the charge-discharge device 60, respectively. The lithium metal 50 may have a sheet form disposed to face the negative electrode 10. The lithium metal 50 can prevent a short circuit phenomenon which may occur by a direct contact between the negative electrode 10 and the lithium metal 50 during electrochemical charge by being spaced apart from the negative electrode 10. Further, the step of impregnating the negative electrode 10 in the pre-lithiation solution 41 may be performed before performing electrochemical charge.

The pre-lithiation solution 41 may contain a lithium salt and an organic solvent.

Specifically, the lithium salt may contain at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, chloro boran lithium, low aliphatic carboxylic acid lithium, and 4 phenyl boric acid lithium.

For example, the organic solvent may contain at least one selected from the group consisting of a carbonate solvent and an ester-based solvent. The non-aqueous solvent may contain at least one selected from the group consisting of propylene carbonate (PC), ethylene carbonate (EC), diethyl carbonate (DEC), dimethylcarbonate (DMC), diprophykane (DPC), dimethylsulfoxide, acetonitrile, dimethoxyethane, diethoxyethane, tetrahydrofuran, N-methyl-2-pyrrolidone (NMP), ethyl methylcarbonate (EMC), gamma boutirolactone (g-boutilactone), ethyl propionate, methyl bropopone, but the present invention is not limited thereto.

Likewise, as the electrochemically charged negative electrode 10 is stored for a predetermined time after washing and drying, lithium ions, which are intercalated by pre-lithiation, may be uniformly diffused to the surface and inside of the negative electrode active material layer.

<Aging>

When pre-lithiation is completed, an inorganic coating layer is formed on the surface of the negative electrode by aging the pre-lithiated negative electrode under a $CO_2$ atmosphere. Specifically, an inorganic coating layer is formed by reaction between lithium ions and $CO_2$ in the negative electrode active material layer in the process of aging the negative electrode under a $CO_2$ atmosphere.

At this time, the inorganic coating layer includes one or more compounds selected from the group consisting of $Li_2O$, $LiOH$ and $Li_2CO_3$, and specifically, the inorganic coating layer may include all of $Li_2O$, $LiOH$ and $Li_2CO_3$. The compounds have an excellent ability in blocking electron transport. As such, when an inorganic coating layer including such a compound is formed, it is possible to effectively block the redox reaction between air or moisture in the air and lithium ions introduced to the negative electrode active material layer.

Namely, it is possible to increase the amount of lithium ions which can be utilized as the lithium reservoir even if the same amount of lithium ions are introduced by suppressing the loss of the introduced lithium ions through pre-lithiation. As a result, it is possible to prevent the decrease of the capacity and cycle characteristics of the battery.

Specifically, the aging may be carried out in a vacuum-based environment, and for example, the pre-lithiated negative electrode can be stored in a sealed chamber and then the aging can be performed in a $CO_2$ atmosphere. Namely, aging is performed under a $CO_2$ atmosphere and may be performed in a state that has lowered the pressure of $CO_2$ to be close to a vacuum state. For example, a pressure of $CO_2$ during the aging may be in a range of 0.1 to 10 mTorr. Specifically, the pressure of $CO_2$ during the aging may be in a range of 1 to 5 mTorr. It is possible to form an inorganic coating layer having a suitable thickness in the pressure range. When the pressure of $CO_2$ is less than the above range, the reaction between $CO_2$ and lithium ions on the surface of the negative electrode may not be smooth, and when the pressure of $CO_2$ exceeds the above range, the amount of lithium ions, which react with $CO_2$, may become too large.

Further, in the aging process, the aging temperature may be in the range of 20 to 60° C., and specifically in the range of 30 to 50° C. In the above temperature range, the lithium ions in the negative electrode can be reacted with $CO_2$ at an appropriate speed.

Further, in the aging process, the aging time may be in the range of 10 to 60 hours, and specifically in the range of 20 to 50 hours. When the aging time is within the above range, an appropriate amount of lithium ions can react with $CO_2$ to thereby form an inorganic coating layer. When the aging time is less than the above range, the reaction of lithium ions and $CO_2$ may not be smooth, and when the aging time exceeds the above range, the amount of lithium ions reacted with $CO_2$ may become too large.

Likewise, according to the present invention, it is possible to form an inorganic coating layer capable of blocking a redox reaction on the surface of the negative electrode by aging the pre-lithiated negative electrode under a $CO_2$ atmosphere. As such, it is possible to suppress the loss of lithium caused by redox reaction between the negative electrode and air and the moisture in the air, and it is possible to prevent the decrease of cycle characteristics and capacity of a battery.

<Negative Electrode>

Further, the present invention provides a negative electrode.

The negative electrode has a negative electrode active material layer formed thereon by coating a negative electrode slurry including a negative electrode active material. Herein, the negative electrode active material layer is pre-lithiated, and one or more compounds selected from the group consisting of $Li_2O$, $LiOH$ and $Li_2CO_3$ are included in the surface of the negative electrode active material layer. At this time, the negative electrode may be manufactured by a method of manufacturing the above-described negative electrode.

An inorganic coating layer capable of blocking the oxidation-reduction reaction is formed on the surface of the negative electrode according to the present invention. As such, it is possible to suppress the loss of lithium caused by redox reaction between the negative electrode and air and the moisture in the air, and it is possible to prevent the decrease of cycle characteristics and capacity of a battery.

<Secondary Battery>

In addition, the present invention provides a method of manufacturing a secondary battery including the negative electrode described above.

The secondary battery has a form where an electrode assembly, which has a form that a separator is interposed between a positive electrode and a negative electrode, is accommodated in a battery case. The positive electrode has a structure that a positive electrode active material layer is formed as a positive electrode slurry containing a positive electrode active material is applied on a positive electrode current collector. Further, with respect to the negative electrode, the above-described one may be used as the negative electrode, and the negative electrode may be manufactured by the method of manufacturing a negative electrode according to the present invention.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}MdO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or CO; olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Further, the positive electrode slurry further contains a conductive material and a binder as well as a positive electrode active material, which is as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Further, the battery case is not particularly limited as long as it is used as an exterior material for packaging the battery, and a cylindrical, square, or pouch type may be used and specifically a pouch-type battery case may be used. The pouch-type battery case is generally made of an aluminum laminate sheet and may be composed of an inner sealant layer for sealing, a metal layer for preventing permeation of materials, and an external resin layer forming the outermost part of the case. Details of the battery case are known to those of ordinary skill in the art, and thus detailed description thereof will be omitted.

When an electrode assembly is accommodated in a battery case, the electrolyte solution is injected and sealed. Thereafter, a final secondary battery is manufactured through the formation process. A lithium salt and an organic solvent used in the above-described pre-lithiation solution may be used as the electrolyte solution. Details about the electrolyte solution are known to those of ordinary skill in the art, and thus detailed description thereof will be omitted.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Negative Electrode>

A mixture of 85 wt % of graphite and 15 wt % of SiO was prepared as the negative electrode active material. 94.5 wt % of the negative electrode active material, 1.3 wt % of Denka black as the conductive material, 3.0 wt % of SBR as the binder, and 1.2 wt % of CMC as the thickener were added to water to thereby prepare a negative electrode slurry.

A negative electrode was manufactured by forming a negative electrode active material layer on two surfaces of a copper negative electrode current collector by coating the negative electrode slurry on two surfaces of a copper current collector (thickness: 8 μm, loading amount: 6.48 mAh/cm²) and rolling and drying the slurry-coated current collector at a vacuum oven of 130° C.

<Pre-Lithiation>

A lithium metal film having a thickness of 6 μm was laminated on the negative electrode active material layer of the negative electrode, which was then stored for a predetermined time, to thereby be pre-lithiated.

<Aging>

An inorganic coating layer was formed on the surface by aging the pre-lithiated negative electrode in a chamber of a $CO_2$ atmosphere of 1 mTorr for 20 hours. At this time, the temperature inside the chamber was maintained at 50° C.

Comparative Example 1

A pre-lithiated negative electrode was prepared in the same manner as in Example 1 except that the aging process was not performed.

Comparative Example 2

A negative electrode was prepared in the same manner as in Example 1 except that the pre-lithiation and aging processes were not performed.

Experimental Example 1

<Preparation of Half Cell>

The negative electrode manufactured in the example 1 and the comparative example 1, and a lithium metal having a thickness of 150 μm, which corresponds to a counter electrode to the negative electrode, were prepared.

A lithium secondary battery was manufactured by interposing a polypropylene separator between the negative electrode according to the example 1 and the comparative example 1, and the lithium metal counter electrode, and injecting an electrolyte. What was obtained by adding $LiPF_6$ as lithium salt and 2 wt % of fluoroethylene carbonate (FEC) as an additive, based on the total weight of the pre-lithiation solution, to an organic solvent, obtained by mixing ethyl methyl carbonate (EC) and ethyl methyl carbonate (EMC) in a volume ratio of 30:70, was used as the electrolyte.

<Measurement of Lithium Dosage of Negative Electrode>

Each of the half cells was full-charged with constant current (CC) of 0.1C, which was then left alone for 20 minutes and was then discharged with the constant current (CC) of 0.1C until reaching 3.0 V. The discharge profile was obtained from this and the discharge capacity (capacity 1) was calculated.

Further, with respect to the negative electrode according to the example 1 and the comparative example 1, the negative electrode before the pre-lithiation step was manufactured as a half cell (reference cell), and the reference cell was charged and discharged as the above, to thereby calculate the discharge capacity (capacity 2). The lithium dosage was calculated from the difference between the capacity 1 and the capacity 2.

Lithium dosage (%)=(capacity 1−capacity 2)*100/capacity 2

As the negative electrode according to the example 1 and the comparative example 1 is stored in a dry room at a room temperature, the lithium dosage was measured using the above method at a point of time right after starting storage and points of time after one day, 5 days and 12 days from the start of the storage. The result was shown in FIG. 4.

Figure 4:
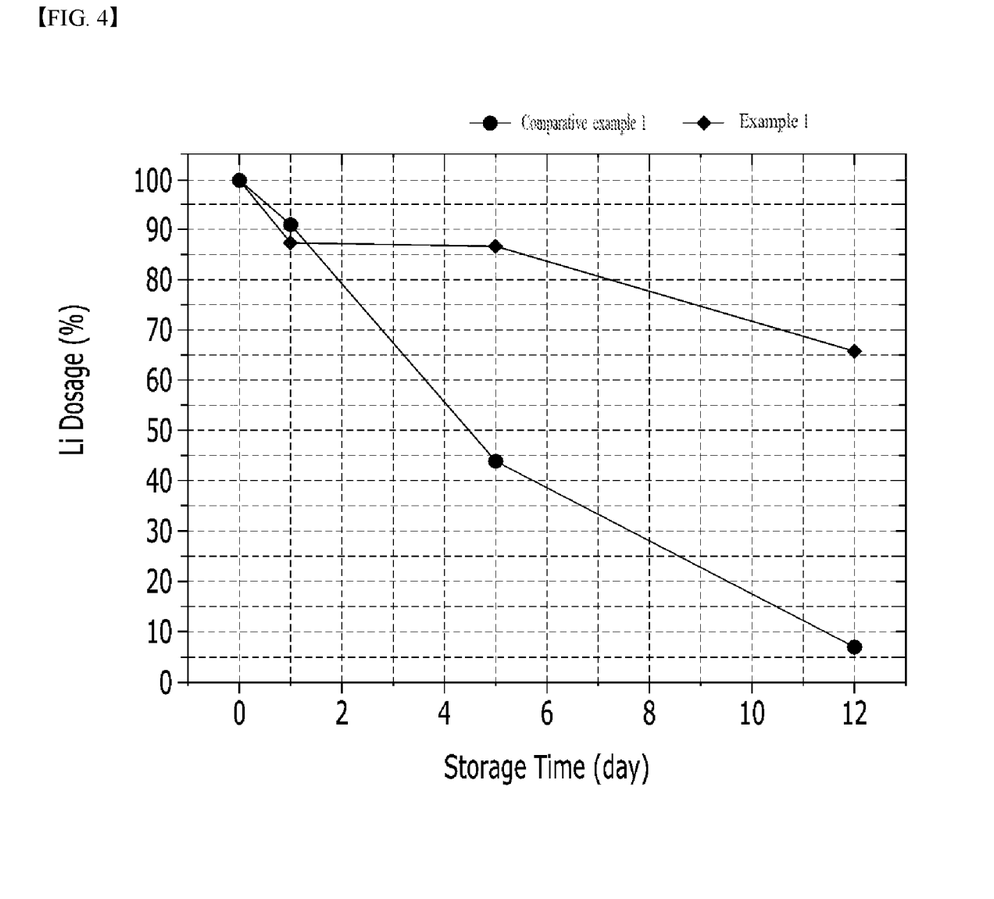
FIG. 4 is a graph showing a change in a lithium dosage according to the storage time for the negative electrode according to Example 1 and Comparative Example 1 of the present invention.

Referring to FIG. 4, the lithium dosage of the negative electrode according to the example 1 was the same as the lithium dosage of the negative electrode according to the comparative example 1 at the point of time right after the start of the storage of the negative electrode, but as the storage time increases, the lithium dosage of the negative electrode according to the comparative example 1 decreased, compared to the lithium dosage of the negative electrode according to the example 1. This was because the lithium ions introduced into the negative electrode reacted with air and moisture in the air because an inorganic coating layer was not formed in the case of the negative electrode according to the comparative example 1. On the other hand, in the case of the negative electrode according to the example 1, an inorganic coating layer including $Li_2O$, $LiOH$ and $Li_2CO_3$ is formed. As such, the reaction between lithium ions introduced into the negative electrode and air and the moisture in the air was suppressed as much as possible.

Example 2

A positive electrode was manufactured by coating a positive electrode slurry, which is generated by mixing $LiNi_{0.8}Co_{0.1}Mn_{0.1}O_2$ as the positive electrode active material, super C as the conductive material, and PVdF as the binder at the weight ratio of 97:1.5:1.5, on an aluminum current collector, rolling the slurry-coated current collector and drying the current collector at 130° C.

A lithium secondary battery was manufactured by interposing a polypropylene separator between the negative electrode according to the example 1 and the positive electrode and injecting an electrolyte. What was obtained by adding $LiPF_6$ as lithium salt and 2 wt % of fluoroethylene carbonate (FEC) as an additive, based on the total weight of the pre-lithiation solution, to an organic solvent, obtained by mixing ethyl methyl carbonate (EC) and ethyl methyl carbonate (EMC) in a volume ratio of 30:70, was used as the electrolyte.

Comparative Example 3

A lithium secondary battery was prepared in the same manner as in Example 2 using the negative electrode according to the Comparative Example 1.

Comparative Example 4

A lithium secondary battery was prepared in the same manner as in Example 2 using the negative electrode according to the Comparative Example 2.

Experimental Example 2

<Evaluation of Capacity Retention Rate>

The capacity retention rates of the lithium secondary battery according to the examples and comparative examples were evaluated using an electrochemical charge-discharge device. During charging, the battery was charged at a current density of 0.1 C-rate up to a voltage of 4.2 V, and discharged to a voltage of 2.5 V at the same current density during discharging. The charging and discharging was carried out up to the 200-th cycle at the above condition.

Figure 5:
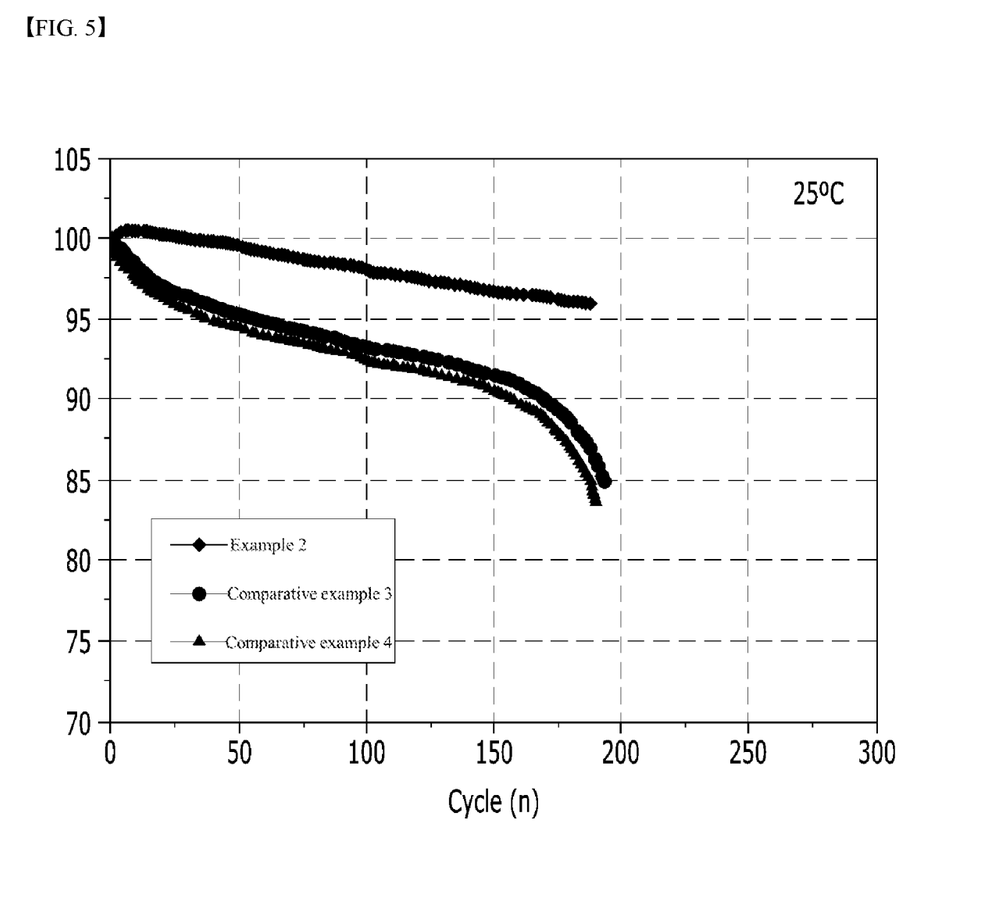
FIG. 5 is a graph showing the capacity retention rate of the secondary battery according to Example 2 and Comparative Examples 3 and 4 of the present invention.

In this process, the capacity retention rate was evaluated according to the following formula 2, and the results are shown in FIG. 5.

Capacity retention rate (%)={(discharge capacity in N-th cycle)/(discharge capacity in the first cycle)}×100 [Formula 2]

(In the above formula 2, n is an integer between 1 to 200)

Referring to FIG. 5, it can be seen that the lithium secondary battery according to Example 2 is excellent in capacity retention rate than lithium secondary battery according to Comparative Example 3 and Comparative Example 4. It was because, in the case of the secondary battery according to the example 2, an inorganic coating layer including $Li_2O$, $LiOH$ and $Li_2CO_3$ is formed on the used negative electrode, and accordingly, the reaction between lithium ions introduced into the negative electrode and air and the moisture in the air was suppressed as much as possible. As a result, it was possible to maximize the amount of lithium ions stored in the negative electrode, and accordingly, the utilization of the capacity of the positive electrode could be maximized.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

10: negative electrode
11: current collector
12: negative electrode active material layer
20: lithium metal film
30: pressing member
40: pre-lithiation reactor
41: pre-lithiation solution 50: lithium metal
60: charge-discharge device

The invention claimed is:

1. A method of manufacturing a negative electrode, the method comprising:
coating a negative electrode slurry comprising a negative electrode active material on at least one surface of a current collector, to form a negative electrode having a negative electrode active material layer formed thereon;
pre-lithiating the negative electrode; and
aging the pre-lithiated negative electrode under an $CO_2$ atmosphere to form an inorganic coating layer on a surface of the negative electrode active material layer.

2. The method of claim 1, wherein the inorganic coating layer comprises at least one compound selected from the group consisting of $Li_2O$, LiOH and $Li_2CO_3$.

3. The method of claim 1, wherein the inorganic coating layer comprises $Li_2O$, LiOH and $Li_2CO_3$.

4. The method of claim 1, wherein the negative electrode active material is selected from the group consisting of a graphite-containing active material, a silicon-containing active material, and mixtures thereof.

5. The method of claim 1, wherein the pre-lithiating of the negative electrode is performed by directly contacting a lithium metal on the negative electrode active material layer.

6. The method of claim 5, wherein the pre-lithiating of the negative electrode comprises bonding a lithium metal film on the negative electrode active material layer and then performing lamination.

7. The method of claim 1, wherein the pre-lithiating of the negative electrode is performed by connecting the negative electrode to a lithium metal and performing electrochemical charging.

8. The method of claim 1, wherein a pressure of $CO_2$ during the aging of the pre-lithiated negative electrode is in a range of 0.1 to 10 mTorr.

9. The method of claim 1, wherein aging of the pre-lithiated negative electrode is performed at a temperature from 20° C. to 60° C.

10. The method of claim 1, wherein aging of the pre-lithiated negative electrode is performed for a time from 10 hours to 60 hours.

* * * * *